Oct. 22, 1968  R. J. STEARN  3,407,398
LIQUID PRESENCE DETECTOR
Filed Jan. 5, 1965
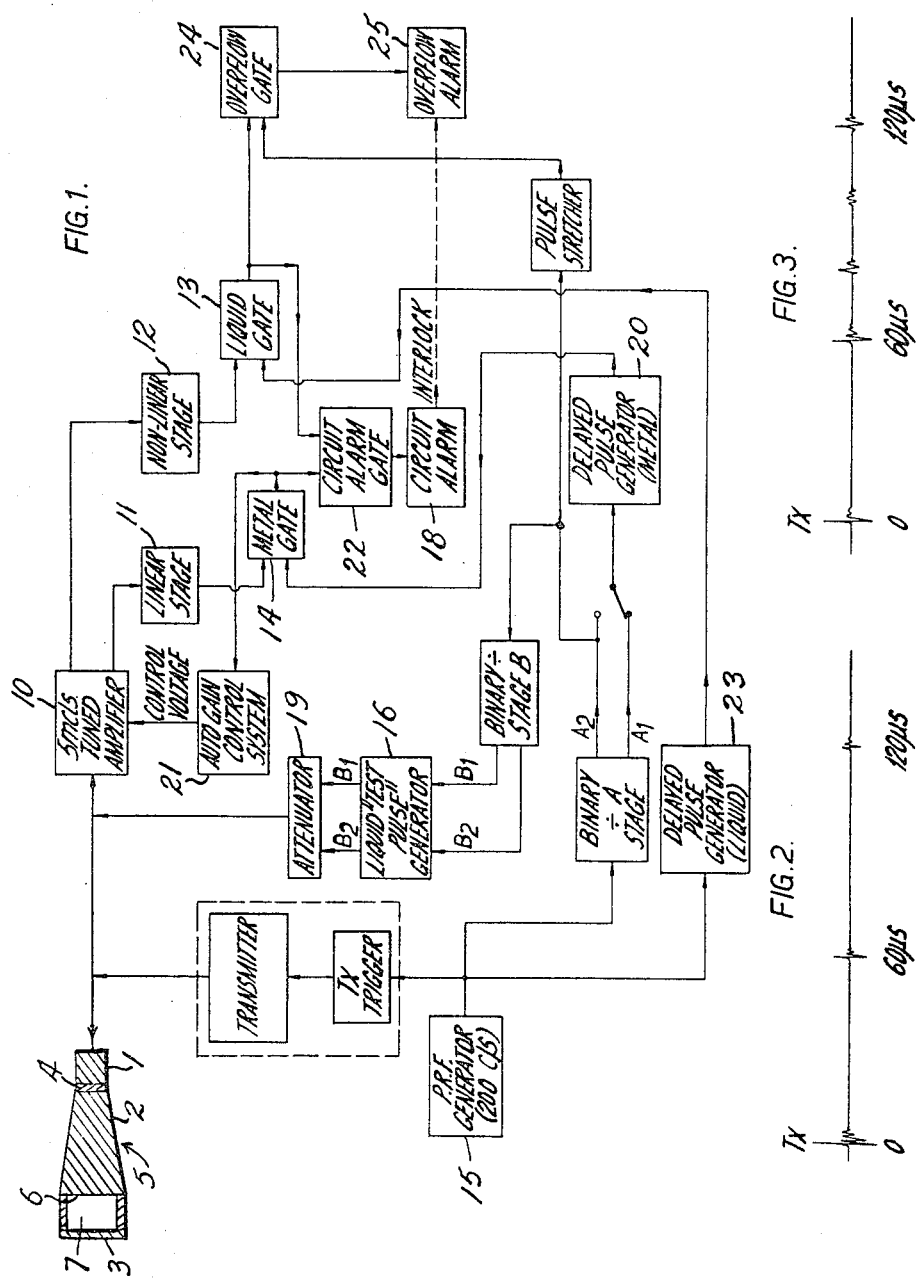
INVENTOR:
RICHARD JOHN STEARN
BY: Morgan, Finnegan, Durham & Pine
ATTORNEYS 3,407,398
LIQUID PRESENCE DETECTOR
Richard John Stearn, Great Bookham, Surrey, England, assignor to The British Petroleum Company Limited, London, England, a corporation of England, and Kins Developments Limited, London, England, a British joint-stock corporation
Filed Jan. 5, 1965, Ser. No. 423,546
Claims priority, application Great Britain, Jan. 30, 1964, 3,967/64
6 Claims. (Cl. 340—244)

ABSTRACT OF THE DISCLOSURE

An ultrasonic probe comprising a solid elongated body portion incorporating an electro-acoustical transducer at one end and a reflector plate spaced from the other end of the body portion is positioned in a chamber and detects the presence of liquid between the plate and body portion by the appearance of ultrasonic reflections from the plate. Upon receipt of such reflected signals by the transducer a response circuit is actuated to control liquid flow.

---

This invention relates to a liquid presence detector, in particular, to a liquid presence detector employing ultrasonic waves.

According to the present invention there is provided a liquid presence detector comprising (a) a metallic probe comprising a head containing a piezo-electric material, a base portion and a reflector plate spaced from the base portion and (b) electrical circuitry comprising a circuit adapted to receive signals generated by the piezo electric material and reflected from the base and from the reflector plate and adapted on receipt of a signal from the reflector plate to generate a further signal.

Preferably the probe is conical in shape between the head and the base. We have discovered that a conical probe reduces the occurrence of trailing pulses due to partial conversion of ultrasonic energy to transverse waves.

Preferably the probe is constructed from aluminium metal.

Suitable piezo-electric materials include quartz, barium titanate, lead zirconate, Rochelle salt and ammonium dihydrogen phosphate.

Preferably the electrical circuitry is continuously self-monitoring and is adapted to give rise to a signal if an abnormality be detected. The abnormality may be the presence of an unexpected signal, the absence of an expected signal or the displacement of an expected signal in time.

Such detector is suitable for use in a liquid flow control system wherein it is desired to initiate or terminate the flow of liquid to a vessel when the liquid level in the vessel reaches a desired value.

It is also suitable for use in a liquid flow control system wherein it is desired to detect a continuous flow of liquid.

The invention is illustrated by but not limited with reference to FIGS. 1 to 3 of the accompanying drawings wherein FIG. 1 is a block diagram of a liquid presence detector according to the present invention and FIGS. 2 and 3 are pulse diagrams.

With reference to FIG. 1:

An aluminium probe 5 comprises a conical portion 2 and a reflector plate 3 spaced from the conical portion. The cylindrical head of the probe contains a piezo-electric material 4, lead zirconate, which serves as an electro-acoustical transducer.

The large diameter end of the acoustically conducting conical portion 2 defines a circular base surface 6. A circular reflector plate 3 is mounted in fixed space relationship to the base surface 6 by means of suitable spacers, thereby defining a space 7 between the reflector plate 3 and base surface 6 of the conductive conical portion 2.

In use, the probe is inserted into a compartment which is being filled with liquid, for example petrol. A pulse repetition frequency (PRF) generator operating at 200 cycles per second actuates a transmitter which excites the piezo-electric material 4 causing it to emit periodic ultrasonic signals. These signals are reflected back to the piezo-electric material from the base surface 6 of the probe. If the liquid level in the compartment has not reached the desired level, i.e. if the space 7 between the base of the conical portion 2 of the probe and the reflector plate 3 is not filled with liquid, then the ultrasonic signals are not transmitted to the reflector plate 3 and the signals from the probe are of the form shown in FIG. 2. If the liquid level has reached the desired level, i.e. if the space 7 between the base of the conical portion 2 of the probe and the reflector plate 3 is filled with liquid, then signals are transmitted to the reflector plate and signals from the probe are of the form shown in FIG. 3.

With reference to FIG. 2:

An ultrasonic signal $T_x$ is emitted from a piezo-electric material 4, and 60 micro seconds later the reflection of the signal from the base of the probe is detected by the piezoelectric material. After a further 60 micro seconds an attenuated reflection of the reflection is detected, and so on.

With reference to FIG. 3:

An ultrasonic signal $T_x$ is emitted from the piezo-electric material 4. 60 micro seconds later the reflection of this signal from the base surface 6 of the probe is detected by the material. After a further few micro seconds, depending on the nature and temperature of the liquid, a reflection of the signal from the reflector plate 3 is detected by the material. After a further few micro-seconds from the detection of the signal from the reflector plate an attenuated signal is detected corresponding to a plate base-plate reflection.

Signals from the piezo-electric material 4 are amplified in a 5 megacycle tuned amplifier 10 from which pulses reflected from the base surface 6 of the cone and the reflector plate 3 are passed to a linear circuit 11 in which the pulses retain their original relative amplitudes, and to a non-linear circuit 12 from which all output pulses have the same amplitude. From the non-linear circuit 12 pulses are fed to a first gating circuit, hereinafter referred to as the liquid gate 13. From the linear stage 11 pulses are fed to a second gating circuit, hereinafter referred to as the metal gate 14.

In order to ensure reliability the instrument continuously and automatically checks its own operation. In brief, signals initiated by the PRF generator 15 are continously monitored by the circuitry before being passed to an alarm circuit. If any signal is not detected or is wrongly detected, for example because of its non-occurrence or occurrence at the wrong time, then the alarm circuit is tripped and a warning is given.

Artificially induced "liquid pulses" are generated in a liquid test pulse generator 16 fed by a binary stage generator B itself fed by a binary stage generator A. By "liquid pulses" we mean signals corresponding in amplitude and timing to those obtained from the reflector plate 3 of the probe 5. The PRF generator 15 supplies the binary generator A which has two outputs A1 and A2. Pulses on phase A1 of the binary stage generator A correspond to PRF pulses 1, 3, 5, 7, 9, etc., those on phase $A_2$ correspond to PRF pulses 0, 2, 4, 6, 8, etc. Each output is therefore at 100 cycles per second.

A second binary stage generator B receives signals from phase $A_2$ and further sub-divides PRF pulses 1, 3, 5, 7, 9, etc. into a sub-phase B1, corresponding to pulses 1, 5, 9, etc. and a sub-phase B2 corresponding to pulses 3, 7, 11, etc. Each output from binary stage generator B is therefore at 50 cycles per second.

Outputs $B_1$ and $B_2$ initiate signals from the liquid test pulse generator 16 corresponding to the earliest and latest times of arrival of genuine signals from the reflector plate 3. Artificial signals are thus interlaced with genuine signals. As the artificial signals are subsequently passed through the same gating circuits 13 and 14 as those from the reflector plate, any deviation in timing of the liquid gating pulse will result in the non detection of one or other of the artificial signals and in the tripping of the alarm 18.

Pulses generated by the liquid test pulse generator 16 are strong in comparison to those detected by the piezo-electric material and they are thus passed an to attenuator 19 to reduce them and to the same order of magnitude before being passed to the amplifier 10.

Signals from phase $A_1$ initiate from a delayed pulse generator 20 a gating pulse corresponding in time to the reflection from the base of the cone 2. These are supplied to one input of the metal gate 14, the remaining input being obtained from the linear circuit 11.

From the metal gate 14 signals are passed to an automatic gain control system 21 which controls the voltage applied to the amplifier 10 in order that it may be sensitive enough to detect the reflected signals.

Pulses from the metal gate 14 are also fed to a third gating circuit hereinafter referred to as the circuit alarm gate 22.

Signals from the PRF generator 15 initiate from a second delayed pulse generator 23 a gating pulse covering the period of time during which signals from the reflector plate may arrive due to different liquids and variations of temperature. These are supplied to one input of the liquid gate 13, the remaining input being obtained from the non-linear circuit 12.

From the liquid gate 13 signals are passed to the circuit alarm gate 22 and to a fourth gating circuit hereinafter referred to as the overflow gate 24.

The circuit alarm gate 22 is adapted to actuate a circuit alarm 18 which gives an indication that the system is not functioning properly before an actual emergency arises.

The circuit alarm 18 is actuated by the non-occurence of one or more signals from the base of the cone, or of the artificial signals. Any failure or malfunction of any circuit detecting or generating genuine or artificial signals will thus actuate the circuit alarm.

The correct functioning of the alarm system may be checked by deliberately removing one or more signals, by switching or other means.

The overflow gate 24 is adapted to actuates an overflow alarm 25 which is adapted to energise the liquid flow controlling mechanism and shut-off the flow of liquid. It may be adapted to reduce the flow of liquid if so desired.

The circuit alarm 18 is connected to the overflow alarm 25 by means of an interlock which acts in such a way that the triggering off of the circuit alarm 18 automatically triggers the overflow alarm 25 but the triggering of the overflow alarm 25 does not trigger the circuit alarm 18.

Each alarm circuit when tripped to the "alarm" state will retain this state until manually reset. Any intermittent fault indication is thus retained by the circuit alarm although that fault may subsequently vanish.

The arrangement is such that each gating circuit will only pass expected signals at the expected time. Any deviation from this pattern, whether caused by malfunctioning of the instrument or by additional signals from the reflector plate is instantly detected. Once a deviation is detected in any part of the circuitry of the instrument it is rapidly transmitted to the circuit alarm 18 or the overflow alarm 25, whichever is relevant, and appropriate action is taken.

I claim:
1. Apparatus for detecting the presence of liquid in a chamber which comprises:
   a unitary metallic probe comprising,
      a head including an electro-acoustical transducer arranged to transmit and receive ultrasonic waves,
      a conducting portion arranged to convey such ultrasonic waves disposed in contact with said head and terminating in a base surface sufficiently remote from said head to provide a distinct reflection, and
      a reflector plate held in fixed spaced relationship to said base surface to define a space therebetween which, when filled with liquid, allows said ultrasonic waves to be conveyed to said reflector plate and reflected therefrom;
   means for periodically energizing said transducer to generate said ultrasonic waves; and
   electrical circuit means arranged to receive electrical signals from said transducer indicative of reflections of ultrasonic waves from said base surface and said reflector plate and,
      on receipt of a signal due to reflection from the reflector plate, to actuate a response circuit and, in the absence of a base surface reflection, to indicate a malfunction.

2. Apparatus as claimed in claim 1, wherein the conducting portion of said probe is frusto-conical and tapers outwardly in a direction away from the head of the probe.

3. Apparatus as claimed in claim 1, wherein said means for periodically energizing said transducer generates repetitive signals for excitation of said transducer, and wherein said electrical circuit means comprises monitoring means adapted to receive said repetitive signals, an alarm gating circuit connected to receive signals from said monitoring means, and circuit alarm means connected to said gating circuit and adapted to be actuated both when an expected signal does not occur at said gating circuit input and an expected signal occurs at the wrong time at said gating circuit input.

4. Apparatus as claimed in claim 3, wherein said monitoring means comprises means for generating artificial test pulses corresponding in amplitude to genuine pulses obtained due to reflection from said reflector plate and corresponding in time to the earliest and latest times of arrival of genuine pulses obtained due to reflection from said reflector plate, and means for interlacing said test pulses and the genuine pulses and passing the interlaced pulses to said alarm gating circuit which actuates said circuit alarm upon the deviation in time and, hence, upon the non-detection of one of said test pulses.

5. Apparatus as claimed in claim 1, wherein the probe is made of aluminium.

6. Apparatus as claimed in claim 1, wherein the transducer includes an element of piezo-electric material selected from the group consisting of quartz, barium titanate, lead zirconate, Rochelle salt, and ammonium dihydrogen phosphate.

References Cited
UNITED STATES PATENTS

| | | | |
|---|---|---|---|
| 3,019,650 | 2/1962 | Worswick | 73—290 |
| 3,100,885 | 8/1963 | Welkowitz et al. | 73—290 X |

FOREIGN PATENTS

| | | |
|---|---|---|
| 809,681 | 3/1959 | Great Britain. |

JOHN W. CALDWELL, *Primary Examiner.*

D. MYER, *Assistant Examiner.*